Patented June 9, 1936

UNITED STATES PATENT OFFICE 2,043,392

METHOD OF TENDERING MEAT

Levi Scott Paddock and Cleo A. Rinehart, Chicago, Ill., assignors to Industrial Patents Corporation, Chicago, Ill., a corporation of Delaware No Drawing. Application July 14, 1933, Serial No. 680,460

11 Claims. (Cl. 99—159)

This invention relates to a method of treating meat. One of the objects of this invention is to provide a method whereby the flesh of edible animal carcasses may be rendered tender. Another object of this invention is to provide a method whereby the tenderness of fresh meat may be improved without in any way altering or detracting from other desirable qualities of the meat. Other objects of the invention will be apparent from the description and claims which follow.

It will be understood that this invention is applicable to all types and varieties of meat. However, by way of illustration, and not by way of limitation, I will discuss the invention as specifically embodied in the treatment of fresh beef.

As is well known, cuts of beef from certain parts of the animal command a higher price on the market than cuts of other portions of the carcass, chiefly because the higher priced cuts are more tender in that these cuts are found to present the minimum resistance to chewing effort.

The problem of grading beef is very largely one of ascertaining by trained observers the probable tenderness of a given carcass or cut of beef.

It is customary in preparing beef of high grade for particularly fastidious consumers to age the beef, that is, to carry the beef under refrigeration for a sufficient length of time to permit the enzymes naturally present in the beef to bring about a noticeable tendering effect. It is necessary, of course, that this aging process be carried on with carefully controlled refrigeration to avoid decomposition. If the aging process is carried on with humidities near 100%, the product becomes moldy to such a degree that appreciable losses are incurred by reason of trimming to remove the mold. If the humidity in the aging refrigerator is kept low enough to prevent mold growth, the surface portions of the carcasses become desiccated, resulting in evaporation loss and the trimming loss necessary to eliminate the desiccated portions.

By the process of the present invention the desirable results attendant to normal aging are secured without the lapse of time required by normal aging and without the attendant difficulties of mold growth on the one hand or desiccation on the other. By the present invention, tenderness of high quality meats may be improved; an average or mediocre meats may be brought to a degree of tenderness equal to that commonly found in the higher quality beef.

The present invention contemplates a practical method of utilizing an aqueous solution of certain enzymes and controlling the action of these enzymes on the meat in such a way that all of the tissues are made tender without undue digestion of any portion. It is well known that animal tissues undergo a disintegration process due to digestion when placed in contact with an active solution of certain enzymes. If this action is permitted to carry on to completion the meat will be digested to such an extent that it loses its natural binding quality. We have found that certain enzymes, such as trypsin, pepsin and papain can be utilized to materially tender carcass beef.

In practice we prepare a dilute solution of the desired enzymes and diffuse the enzymes by injection into the arterial system of the carcass under sufficient pressure to force the dilute enzyme into the extending capillaries and then hold the meat under refrigeration sufficiently low to avoid spoilage for a short period of time, usually one to five days. By utilizing the vascular system for obtaining contact between the digestive enzyme and the individual connective tissues of the meat we are enabled to treat any single portion of the carcass without affecting the remaining portions. This is done by dissecting out the end of any main artery or blood vessel leading to a particular portion of the carcass which it is desired to treat, the dilute enzyme being injected into the selected blood vessel. If it is desired to treat the entire carcass the injection of the dilute enzyme can be made into the arteries leading from the heart.

In carrying out our invention, where it is desired to treat the entire carcass, the animal is slaughtered in the usual manner, that is, ordinarily stunned and bled to eliminate the major portion of the blood and serum from the tissues and blood vessels. The animal is then hung up and dressed by removing the skin, head and entrails. Prior to the removal of the entrails, in the practice of our invention an incision is made to expose the heart and render the aorta artery accessible. The arteries leading from the heart are connected with a line containing a dilute aqueous solution of papain, for example, under pressure and the dilute enzyme is forced throughout the vascular system until the capillaries are filled to distention.

It will be understood that any proteolytic enzyme may be used in carrying out our invention although we prefer papain which gives the desired effect without in any way affecting the flavor or other qualities of the meat.

We claim:

1. The process of treating meat which comprises pumping a dilute aqueous solution of a proteolytic enzyme through the vascular system thereof and carrying the meat under refrigeration.

2. The process of treating meat which comprises pumping a dilute aqueous solution of a proteolytic enzyme through the vascular system thereof and carrying the meat under refrigeration until partial proteolysis has tendered the meat.

3. The process of treating meat which comprises pumping a dilute aqueous solution of a proteolytic enzyme through the vascular system of the meat and holding the meat under refrigeration for a period of one to five days.

4. The process of treating meat which comprises pumping a dilute solution of a proteolytic enzyme into the vascular system of the meat in quantity sufficient to distend the capillaries and thereafter carrying the meat under refrigeration for a period of one to five days.

5. The process of treating carcass beef which comprises dissecting out the arteries leading from the heart, and before the entrails have been removed from the carcass pumping into said arteries a dilute aqueous solution of papain in sufficient quantity and under sufficient pressure to completely fill the vascular system and fill the capillaries to distention, and thereafter completing the dressing of the carcass and carrying the meat under refrigeration until partial proteolysis has occurred.

6. The process of treating meat which comprises pumping a dilute solution of papain through the vascular system and holding the meat under refrigeration for a period of one to five days.

7. The process of treating beef which comprises pumping a dilute solution of papain through the vascular system and holding the beef under refrigeration for a period of one to five days.

8. The process of treating meat which comprises pumping a dilute solution of trypsin through the vascular system and holding the meat under refrigeration for a period of one to five days.

9. The process of treating beef which comprises pumping a dilute solution of trypsin through the vascular system and holding the beef under refrigeration for a period of one to five days.

10. The process of treating meat which comprises pumping a dilute solution of pepsin through the vascular system and holding the meat under refrigeration for a period of one to five days.

11. The process of treating beef which comprises pumping a dilute solution of pepsin through the vascular system and holding the beef under refrigeration for a period of one to five days.

LEVI SCOTT PADDOCK.
CLEO A. RINEHART.